Dec. 20, 1932.  G. C. BURD  1,891,343
STRANDING
Filed July 14, 1931   2 Sheets-Sheet 1
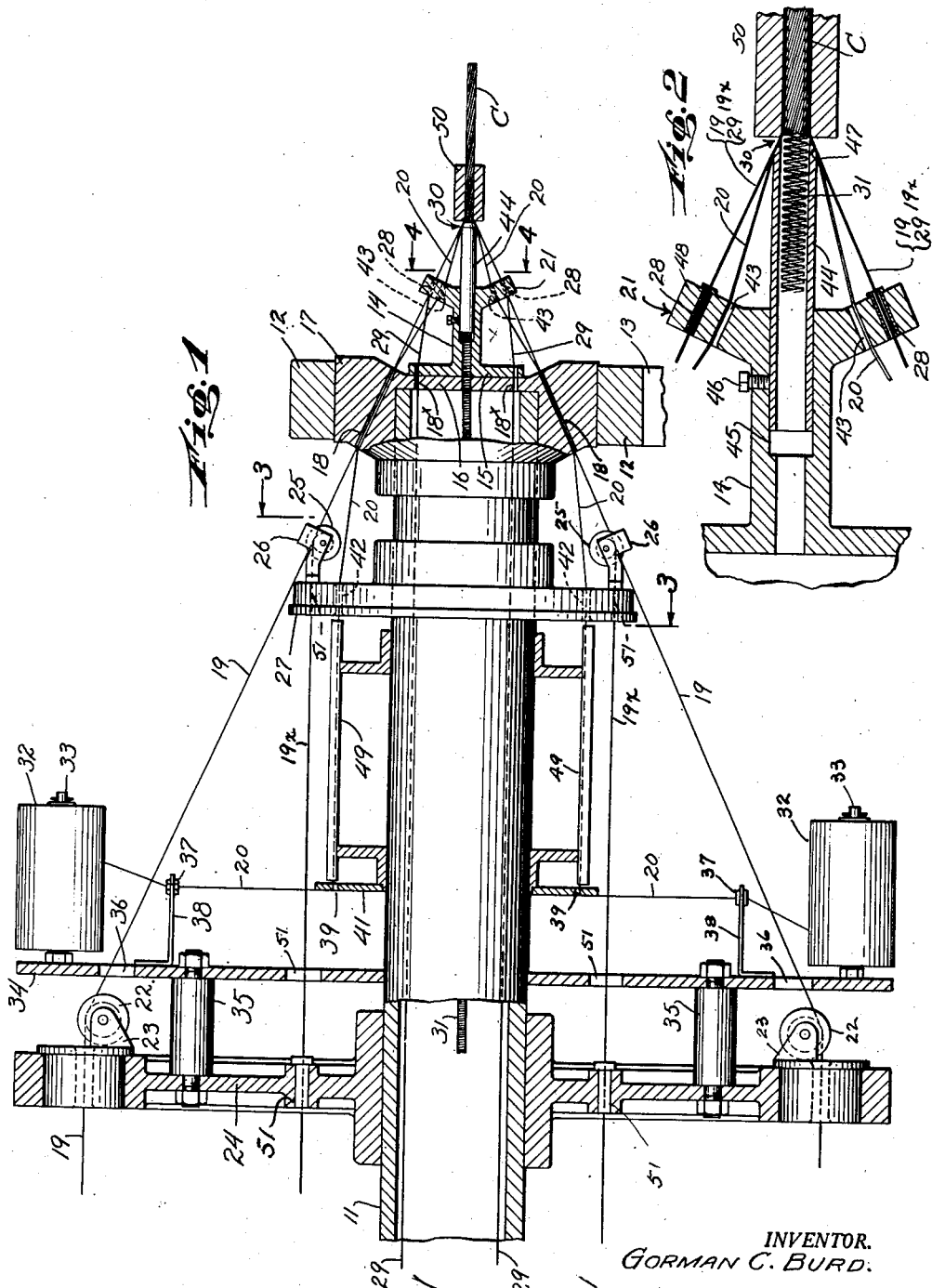
INVENTOR.
GORMAN C. BURD.
BY
ATTORNEY Dec. 20, 1932.    G. C. BURD    1,891,343
STRANDING
Filed July 14, 1931    2 Sheets-Sheet 2
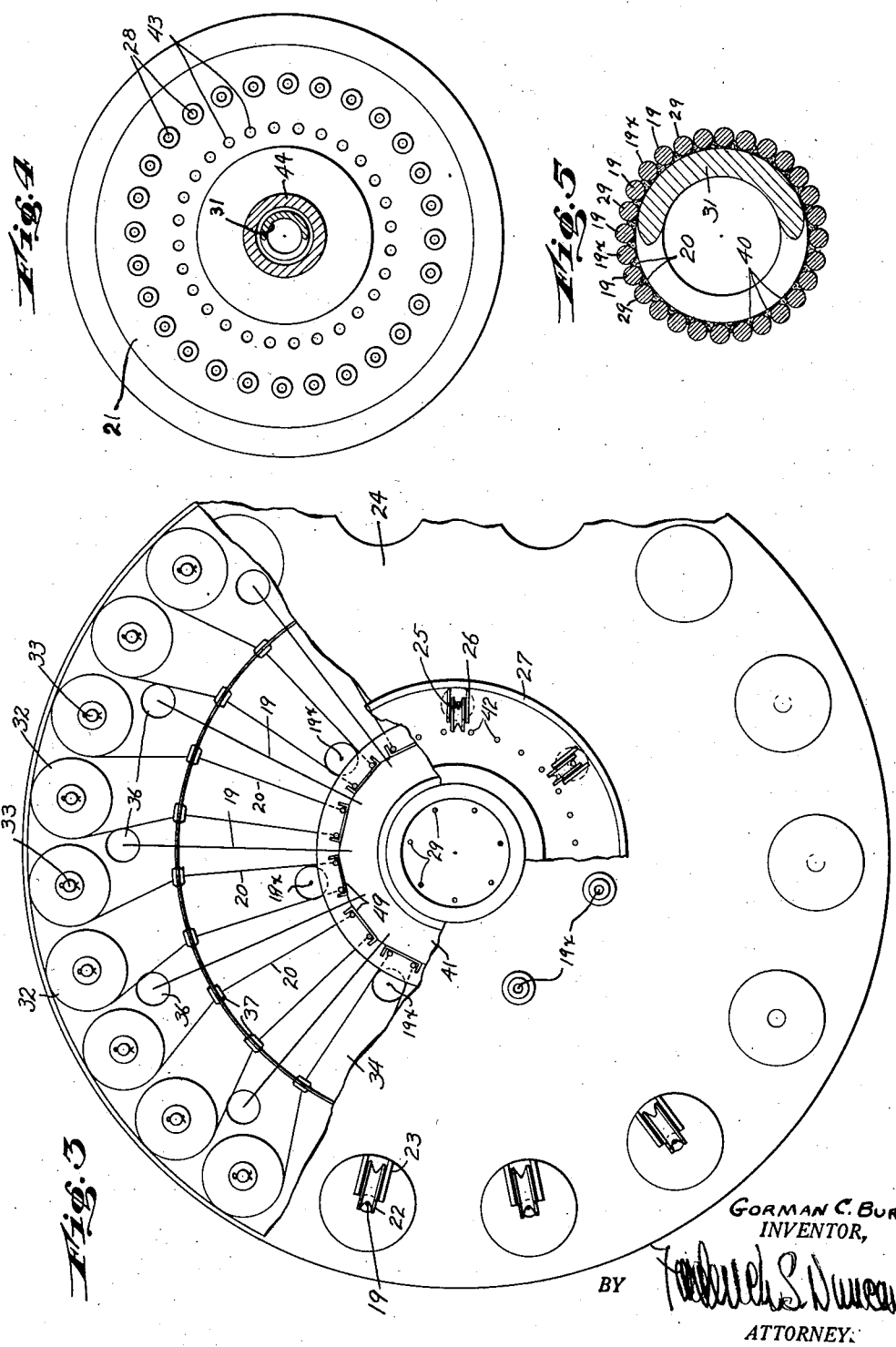

Patented Dec. 20, 1932

1,891,343

UNITED STATES PATENT OFFICE

GORMAN C. BURD, OF ADRIAN, MICHIGAN, ASSIGNOR TO AMERICAN CABLE COMPANY, INC., OF NEW YORK, N. Y., A CORPORATION OF DELAWARE

STRANDING

Application filed July 14, 1931. Serial No. 550,679.

This invention relates to the fabrication of stranded wire structures, and more particularly to the fabrication of such helically wound metal conduits as are intended to contain lubricant, one desirable use for the improved conduit fabricated in accordance with this invention being as a casing for brake-operating cables or similar power-transmitting members, although the invention may be utilized in the production of stranded wire structures for any suitable purpose.

An object of the invention is to provide for the fabrication of a conduit having a plurality of helically wound layers of wire of circular or any suitable cross section, with an intermediate layer or layers composed of a multiplicity of cotton cords or other suitable strands of packing material, by a process which comprises the step of laying the individual wire components and the packing components concurrently upon a core of coiled wire or upon any other suitable underlying form of tubular core, with the packing components pre-arranged within the inner helical interstices of the wire components.

A cognate object of the invention is to provide for the assembly of a series of wire components and a series of packing strand components in close alternating helical juxtaposition, side by side, with the packing strands occupying their proper relative position, within the inner helical interstices of the wire components, prior to the step of laying the components, so assembled, concurrently upon the core.

Another object of the invention is to provide an improved machine for carrying the above process into effect.

Still another object is to provide a machine of the kind above described with means for protecting the packing-strand components from injury by any of the wire components which may become broken in the operation of the machine.

The above and other features of the invention are illustrated and described in the accompanying drawings and specification and are pointed out in the claims.

In the drawings:

Fig. 1 is a view in vertical longitudinal section, with parts shown in elevation, of a machine in the construction of which the invention has been embodied.

Fig. 2 is a fragmentary detail view on a larger scale of the forming head of the above machine.

Fig. 3 is an end view of the rotor shown detached and looking from the right of the figure as it appears on the sheet.

Fig. 4 is a vertical sectional view on the line 4—4 of Fig. 1, on a larger scale.

Fig. 5 is a vertical sectional view of a conduit fabricated according to the process of the present invention, and upon the machine shown and described.

In the now-preferred embodiment of the machine selected for illustration, as a suitable form of apparatus by which to carry the invention into effect, the part designated by the reference character 11 is a hollow shaft which is mounted rotatably in bearings 12 on any suitable supporting base, of which base part of a supporting standard is shown at 13, the machine being provided with any suitable means (not shown) for effecting the rotation of the shaft and 14 designates a lay head having a flange 15 adapted to be bolted or otherwise secured, as at 16, to the forward end of the shaft 11, which has a guide collar 17 supported rotatably in the bearing 12, the collar having guide openings 18 converging toward the central axis of the shaft. These openings are disposed in annular series and serve for guiding the component wires 19, 19x, 29 and packing strands 20, of which the conduit is to be fabricated, toward a forming collar 21 on the lay head, the openings 18 in the guide collar 17 being used in alternating series for the wires 19, 19x, 29 and packing strands 20.

The wires 19, 19x and 29 and packing strands 20 may be of any suitable number, material, size and cross sectional form, and may be derived from any suitable source, and as one convenient source planetary supply reels of conventional form may be mounted in conventional manner upon a fly carried by the shaft, but not illustrated, as such flies provided with planetary supply reels are well known in the art. These planetary supply reels are preferably used to prevent twisting of the wires.

Some of the wires 19 are led over guide rollers 22, journalled in brackets 23 carried by a spider 24 fast on the shaft 11, and over similar rollers 25 journalled in brackets 26 carried by a collar or guide plate 27 also fast on shaft 11, passing thence through the openings 18 in collar 17 and through openings 28 in the flange 21 on lay head 14 to the lay point 30 where they are laid upon a tubular core 31 which is fed through the hollow shaft 11 from a suitable source (not shown).

Others of the component wires 19x are led directly from the source of supply through openings 51 in the spider 24 and in the guide plate 17 and over guide rollers 25 to the series of openings 18 in the collar 17 and thence to the wire-receiving openings 28 in the flange 21 of the lay head and on to the lay point 30.

Still other wire components 29 are supplied, from certain of the planetary reels above mentioned, through the hollow shaft 11 and through openings 18x in the collar 17 and flange 15 to certain of the openings 28 in the forming flange 21 of the lay head 14 and thence pass in converging relation to the lay point 30 where they are laid upon the core 31 side by side with the wires 19 and 19x.

Similarly, the packing-strand components may conveniently be derived from spools or cops 32 mounted on spindles 33 screwed into a spool plate 34 mounted on posts 35 carried by the spider 24; the spool plate having openings 36 to pass the wires 19 and also having eyes or bushings 37 mounted in guide brackets 38 through which bushings pass the packing strand components 20, which in the instance illustrated consist of ordinary cords of cotton or other suitable material and of proper size to fit snugly within the inner helical interstices 40 (see Fig. 5) between the wire components 19, 19x and 29 when laid into the conduit structure.

The supply spools 32 and guide bushings 37 are so disposed that the cords 20 do not interfere with the wires 19 and they are led from the guide bushings 37 to holes 39 in a guide flange 41 and thence to holes 42 in the guide collar 27 and then to the appropriate series of holes 18 in collar 17 and to the flange 21 of lay head 14, which is provided with a series of holes 43 through which the packing cords pass to the lay point 30.

In pursuance of the invention the holes of the last mentioned series 43 are nearer the core than the holes 28 of the series through which the wires 19, 19x and 29 pass to the lay point thus making it possible to hold the wires and cords respectively in their proper relative positions as near to the forming or lay point as possible, an arrangement which provides for a very accurate placing of the packing cords in the inner helical interstices 40 between the wires 19, 19x and 29.

The invention provides further means for accurate positioning of the components at the lay point 30, in the form of a nozzle 44, which constitutes an extension of the shaft 11 and lay head 14, being fitted within an axial bore or socket 45 in the lay head (see Fig. 2). The nozzle is adjustable longitudinally in this socket, and may be secured in adjusted position by suitable means such as the set screw 46.

The forward end of the nozzle has a chamfer 47 corresponding to the angle of the wires 19, 19x and 29 between the lay head flange 21 and the mouth of the die 50, which latter may be of conventional or suitable form, and through which the completed conduit is drawn off by any suitable winding up and storage mechanism (not shown) which serves also as means to feed the core 31 and other components forward being timed in suitable coordination with the speed of rotation of the shaft 11 and the associated operating parts.

By proper adjustment of the nozzle 44, the wires 19, 19x and 29 will just come in contact with the chamfer 47 as they pass into the die 50 and the cords 20 also ride over the chamfer in the same manner. They are held against displacement by the different angle at which they approach the chamfer, as compared with the angle at which it is approached by the wires 19, 19x and 29 (see Fig. 2) and the close contact of the wires with the chamfer prevents the cords 20 from crossing or shifting under the wires.

The above described arrangements result in a very accurate pre-arrangement of the wire and packing strand components relatively to each other and relatively to the tubular core 31, which latter, as already indicated, may be of any suitable material, size and structure to serve the intended purpose.

In the instance illustrated this tubular core is constituted by a helically coiled, somewhat resilient wire having coils of relatively short pitch as compared with the coils of the outer helically wound wires 19, 19x and 29, of which there may be any suitable number of layers, only one being illustrated, by way of example.

Where there is more than one outer layer of wires 19, 19x and 29 there may be a corresponding provision of packing cords or strands 20 applied by the process hereinbefore described and by means of the machine herein disclosed with such suitable adjustments or modifications as may be found necessary or desirable.

Whatsoever may be the number of layers, it has been found that the conduit C thus fabricated is adapted to receive and retain lubricant or other semi-fluid or fluid substances, of any suitable character, and to serve efficiently as a casing for brake-operating cables or power-transmitting members of any suitable type, and is capable of many analogous uses.

At the region between the guide plates 27 and 41 the packing cords or strands 20 may be and preferably are protected by guard troughs or members 49 which prevent the cords from being severed by a broken wire if one or more of the wire components 19 or 19x is broken, as happens occasionally, and this is a very desirable provision for the reason that a single broken wire is very apt to break several of the cords 20 during the time required to bring the machine to a full stop. Several cords may be protected by each guard.

I claim:

1. The process of fabricating stranded structures of the type characterized by a central core and an outer layer of wire laid helically thereon, with an intermediate layer of packing material, said process comprising the step of feeding said core forward, and concurrently laying thereon in helical relation a series of strands of packing material and a series of wires, said packing strands and wires being applied to the periphery of said core in alternate series, side by side, and said packing strands occupying the inner helical interstices between said wire components.

2. The process of fabricating metal conduit of the type characterized by a central tubular core and an outer layer of wire laid helically thereon, with an intermediate layer of packing material, said process comprising the step of feeding said core forward and concurrently laying thereon in helical relation a series of strands of packing material and a series of wires, said packing strands and wires being applied to the periphery of said core in alternate series, side by side, said packing strands occupying the inner helical interstices between said wire components.

3. In a machine for fabricating a stranded wire structure of the type characterized by a central core and an outer layer of wires laid helically thereon; with an intermediate layer of packing material; a hollow shaft through which said tubular core is supplied, means to supply said wire components and strands of packing material, and guides for said wire components and packing strands respectively, said wire guides being adapted to deliver said wire components in converging relation upon said core, and said packing strand guides being adapted to deliver the packing strands in converging relation upon said core in a series confined within said converging wires and in position for accurate entry within the inner helical interstices between said wire components, concurrently with the formation thereof, means to feed said core, wires and packing components, longitudinally, and means to close the same into said structure.

4. In a machine for fabricating metal conduit of the type characterized by a central tubular core and an outer layer of wires laid helically thereon; with an intermediate layer of packing material, a rotatable hollow shaft through which said tubular core is supplied, means to supply said wire components and strands of packing material in position to revolve about the axis of said shaft, and guides for said wire components and packing strands respectively, said wire guides being adapted to deliver said wire components in converging relation upon said core, and said packing strand guides being adapted to deliver the packing strands in converging relation upon said core in a series confined within said converging wires, and in position for accurate entry within the inner helical interstices between said wire components concurrently with the formation thereof, means to feed said core, wires and packing components, longitudinally, and means to close the same into said conduit structure; said machine being further characterized by a lay head constituting one of said guides and by a nozzle extending from said lay head toward said closing means.

5. In a machine for fabricating metal conduit of the type characterized by a central tubular core and an outer layer of wires laid helically thereon; with an intermediate layer of packing material, a rotatable hollow shaft through which said tubular core is supplied, means to supply said wire components and strands of packing material in position to revolve about the axis of said shaft, and guides for said wire components and packing strands respectively, said wire guides being adapted to deliver said wire components in converging relation upon said core, and said packing strand guides being adapted to deliver the packing strands in converging relation upon said core in a series confined within said converging wires, and in position for accurate entry within the inner helical interstices between said wire components concurrently with the formation thereof, means to feed said core, wires and packing components, longitudinally, and means to close the same into said conduit structure; said machine being further characterized by a lay head constituting one of said guides and by a nozzle extending from said lay head toward said closing means, said nozzle having a chamfered end in close proximity to said closing means, and over which said component wires and packing strands are drawn closely, side by side, in alternating series.

6. In a machine characterized as in claim 5, a lay head having a socket in which said nozzle is mounted in longitudinally adjustable position, with means to secure said nozzle in adjusted position.

7. In a machine for fabricating metal conduit of the type characterized by a central tubular core and an outer layer of wires laid helically thereon, with an intermediate layer of packing material, a rotatable hollow shaft through which said tubular core is supplied, means to supply said wire components and strands of packing material in position to revolve about the axis of said shaft, a plurality of guides for said wire components and packing strands respectively, and means to protect said strands from damage by wire components when the latter are broken.

8. In a machine for fabricating metal conduit of the type characterized by a central tubular core and an outer layer of wires laid helically thereon, with an intermediate layer of packing material, a rotatable hollow shaft through which said tubular core is supplied and means to supply said wire components and strands of packing material in position to revolve about the axis of said shaft, certain of said wire components being supplied through said hollow shaft, guides for said wire components and packing strands respectively, said wire guides being adapted to deliver said wire components in converging relation upon said core, and said packing strand guides being adapted to deliver the latter in converging relation upon said core in a series confined within said converging wires and in position for accurate entry within the inner helical interstices between said wire components, concurrently with the formation thereof, means to feed said core, wires and packing components longitudinally, and means to close the same into said conduit structure.

In testimony whereof, I have signed this specification.

GORMAN C. BURD.